United States Patent [19]
Duffy

[11] Patent Number: 5,859,081
[45] Date of Patent: Jan. 12, 1999

[54] PROCESS FOR PRODUCING FROTH POLYURETHANE FOAM

[75] Inventor: Robert D. Duffy, West Chester, Pa.

[73] Assignee: ARCO Chemical Technology, L.P., Greenville, Del.

[21] Appl. No.: 731,782

[22] Filed: Oct. 18, 1996

Related U.S. Application Data

[62] Division of Ser. No. 521,055, Aug. 30, 1995, Pat. No. 5,604,267.

[51] Int. Cl.$^6$ ................................. C08G 18/00
[52] U.S. Cl. ............. 521/133; 521/917; 428/423.3; 428/304.4; 264/45.1
[58] Field of Search ................ 521/917, 133; 428/423.3, 304.4; 264/45.1

[56] References Cited

U.S. PATENT DOCUMENTS

| | | | |
|---|---|---|---|
| 3,706,681 | 12/1972 | Bochuca | 260/2.5 |
| 3,755,212 | 8/1973 | Dunlap | 260/2.5 |
| 3,772,224 | 11/1973 | Marlin et al. | 260/2.5 |
| 3,821,130 | 6/1974 | Barron et al. | 260/2.5 |
| 3,849,156 | 11/1974 | Marlin et al. | 117/10 |
| 3,862,879 | 1/1975 | Barron et al. | 161/159 |
| 3,960,998 | 6/1976 | Allen | 264/45.1 |
| 4,216,177 | 8/1980 | Otto | 264/25 |
| 4,336,089 | 6/1982 | Asperqer | 156/152 |
| 4,441,211 | 4/1984 | Donzis | 2/2 |
| 4,483,894 | 11/1984 | Porter et al. | 428/95 |
| 4,925,508 | 5/1990 | Goto et al. | 156/79 |
| 5,273,695 | 12/1993 | Brown et al. | 264/45.1 |

OTHER PUBLICATIONS

G. Oertel; *Polyurethane Hanbook*; 1985; pp. 241–242.

"Methanically Frothed Urethane: A New Process For Controlled Gauge, High Density Foam", L. Martin et al., *J. Cell Plas.*, v. 11, No. 6, Nov./Dec. 1975.

*Primary Examiner*—Rachel Gorr
*Attorney, Agent, or Firm*—Jonathan L. Schuchardt

[57] ABSTRACT

High quality, consistent polyurethane froth foams, both filled and unfilled, are prepared by directing polyol, isocyanate, and optionally other polyurethane-forming ingredients to a high pressure mix head prior to introducing the mixture to a froth foaming head. Changes in stoichiometry may be made rapidly without shut-down. An in-line blender incorporated filler into the polyol stream minimizing density differentials normally encountered in the holding tank, maintaining low and reproducible viscosity, and allowing for greater amounts of filler than otherwise possible.

5 Claims, 2 Drawing Sheets

PROCESS FOR PRODUCING FROTH POLYURETHANE FOAM

This is a division of application Ser. No. 08/521,005 filed Aug. 30, 1995 now allowed as U.S. Pat. No. 5,604,267, issued Feb. 18, 1997.

TECHNICAL FIELD

The present invention pertains to polyurethane froth foam. More particularly, the present invention pertains to a process for preparing polyurethane froth foam with enhanced processability.

BACKGROUND ART

Especially since the advent of the Montreal Protocol severely limiting the use of CFC (chlorfluorocarbon) and other halogenated hydrocarbon blowing agents, frothed foams have become increasingly important. By the term "frothed foam" and similar terms is meant a cellular foam product the cells of which are formed by the mechanical incorporation of inert gas, particularly air, nitrogen, carbon dioxide, or argon, into a curing polymer system, with or without the aid of small amounts of blowing agents of the physical or chemical types. Froth foams have been prepared from polymer systems such as SBR latex, PVC plastisol, and polyurethane, to the latter of which the present invention pertains.

Polyurethane froth foams have been used for numerous years, for example in the preparation of foam-backed industrial carpet and carpet underlay. See, e.g., "Mechanically Frothed Urethane: A New Process for Controlled Gauge, High Density Foam", L. Marlin et al., J. CELL PLAS., v. 11, No. 6, November/December 1975, and U.S. Pat. Nos. 4,216,177; 4,336,089; 4,483,894; 3,706,681; 3,755,212; 3,772,224; 3,821,130; and 3,862,879, which are herein incorporated by reference.

In the processes disclosed in these references, the polyurethane reactive components: the isocyanate ingredients (A-side), and polyol ingredients (B-side) are each stored in separate, often heated, and sometimes aerated holding tanks. The two components are then metered into a standard froth foam mixing head at low pressure, to which is also fed a supply of compressed air. The mix head contains mixing blades or similar devices moving at high speed, which whips air into the reacting mixture to produce a foam having a consistency not unlike shaving cream or whipped cream.

Due to the intensive mixing which occurs in the froth foam head, as well as the air normally introduced either intentionally or unintentionally into the B-side holding tank, premixing of the reactive foam ingredients has not been considered necessary. Mixers such as those from Hobart or Oakes, of rather conventional construction, have been thought sufficient to provide thorough mixing of foam-forming ingredients. Even more thorough and efficient mixers include stator cylinders containing multiple rows of pins within which revolves a rotor also carrying multiple rows of pins which can rotate between the stator pins. Such mixers are available, for example, from Lessco Corp., Dalton, Ga.

The froth foam is allowed to exit the mixer onto a conveyor belt on which, for example, a release sheet or carpet backing travels, is leveled with the aid of a roller or doctor blade, and generally passed through a curing oven or heated with radiant energy to cure the foam. For some uses, the foam is conveyed through a large diameter hose to the point of application. For many applications, for example carpet underlay, considerable amounts of fillers such as calcium carbonate or alumina trihydrate are added to the B-side to increase the density and load bearing capacity of the foam.

Despite representing standard industry practice for many years, the processes previously described suffer from numerous drawbacks. For example, the change in ambient temperature which may occur between day-shifts and night-shifts or even between the morning and afternoon of the same shift can cause differences in the rate of the urethane polymerization reaction. Changes in atmospheric moisture can also affect the process as can changes in conveyor belt temperatures, etc., caused by continuous running of the process. In the past, changing processing chemistry past merely adjusting A-side/B-side ratios has required halting the process, adjusting the A-side and/or B-side ingredients in the holding tanks, and restarting the process. However, in most cases, the frothing head, and foam conveyor hoses when used, must be cleaned out. The result is loss of manufacturing time which increases cost of the product. In U.S. Pat. No. 4,925,508, for example, is proposed a disposable polyethylene or polystyrene pre-expansion chamber designed to partially reduce down-time.

In the manufacture of filled froth foam, further problems arise. In commercial processes, fillers such as calcium carbonate or alumina trihydrate are added to the B-side (polyol) in quantities up to 300 parts per 100 parts polyol. The filler and polyol components are intensively high-shear mixed, and transferred to a holding tank which is either unstirred or stirred with but modest agitation. Air may be incorporated into the filler/polyol to aid in the froth foaming process in addition to air supplied at the froth foam head, or may be "unintentionally incorporated" due to air entrained in the filler or incorporated from the head space above the polyol during high speed mixing. Once in the holding tank, however, entrained air tends to rise to the top while filler tends to settle to the bottom. There may be more than a two-fold difference between the B-side density at the bottom of the tank and the top of the tank, i.e., 6 lbs/gal at the top and 14 lbs/gal at the bottom. Since the pumps supplying the froth foam head are positive displacement pumps, not only does the density of the product change over time, but the polymerization chemistry changes as well due to the variation in polyol content of the B-side caused by movement of air and filler.

To counteract the difference in density, some processes link the low pressure positive displacement pumps with mass flow devices which measure mass flow rather than volume flow and adjust volume flow accordingly in a closed loop process. While such measures maintain density, they do not maintain chemical stoichiometry, but rather can adversely affect stoichiometry, since the less dense B-side, the volume of which the closed loop process will cause to increase, may already contain a higher weight percent polyol than that desired.

Also important in filled systems is the phenomenon of B-side viscosity increase over time. Over time, the filler/polyol mixture increases considerably in viscosity, perhaps due to greater wetting of the filler surfaces with polyol. It is not uncommon for the viscosity to increase from 2000 cps to 4000 cps over a time of two hours, for example. The increased viscosity reduces pumping efficiency, and more importantly, adversely affects the frothing operation. The result of this and the foregoing factors make continuous production problematic. It is not uncommon for production to be halted every few hours to adjust process parameters, with the deleterious effects on process time previously described.

At times, it is desirous to provide a froth foam product which is multilayered, for example a first layer of lower density and higher resiliency and a second layer of higher density and lesser resiliency. In the past, production of such products has met with but limited success. At the exterior of the first produced foam surface, the froth exhibits coalescence, forming relatively large cells. Since the second froth foam layer, like the first, does not exhibit the expansion typical of blown polyurethane foams which might be sufficient to force the expanding polyurethane into the surface of the first layer, a second froth foam layer does not adhere well to the first layer, resulting in the potential for delamination during production and/or use.

It would be desirable to provide a process for the production of polyurethane froth foam in which the polyurethane stoichiometry can be adjusted on the fly, rather than requiring shut down. It would be further desirable to provide a process for the preparation of filled polyurethane froth foam in a consistent and reliable manner without resorting to use of mass flow meters and other devices. It would be yet further desirable to provide a process for producing polyurethane froth foam wherein multiple layers of foam may be successfully applied. It is further desirable to provide a process where uniform froth foam can be produced, even at low density.

SUMMARY OF THE INVENTION

It has now been surprisingly discovered that consistent, high quality polyurethane froth foam may be produced in a process where the polyurethane reactive ingredients are first delivered to a standard high pressure mix head prior to entry into a standard froth foam head. In a preferred embodiment, filled froth foams are produced by blending filler in-line with the polyol stream prior to entry into the high pressure mix head. The froth foam produced exhibits more uniform cell structure than prior art froth foams, and unexpectedly generates a smooth interface with minimum coalescence, allowing for production of high quality multiple layer froth foam products.

DESCRIPTION OF THE PREFERRED EMBODIMENTS

Figure 1:
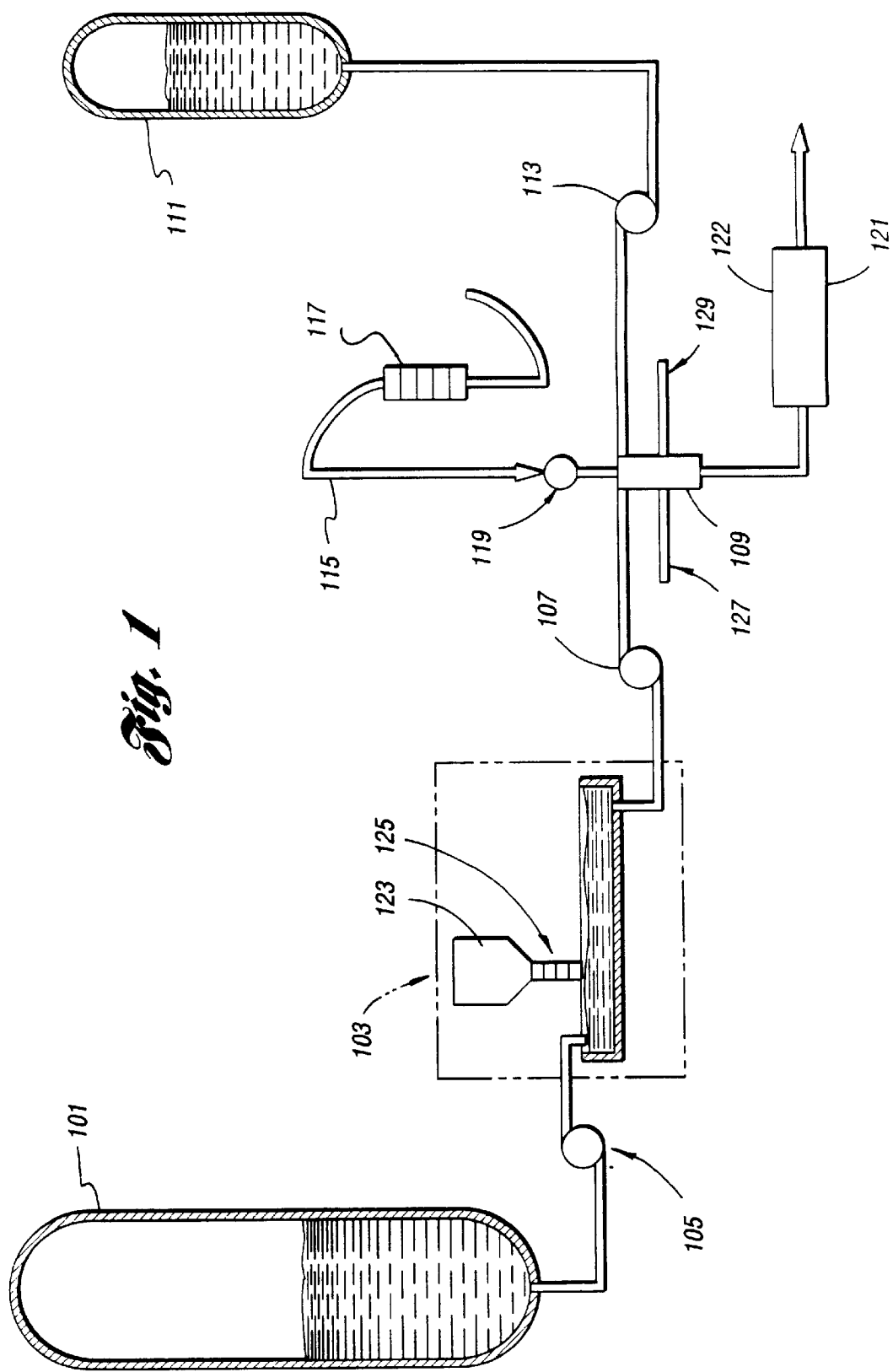
FIG. 1 illustrates a schematic of one embodiment of the process of the subject invention.

The process of the subject invention may be described with reference to the process schematic of FIG. 1. In FIG. 1, the polyol B-side is contained in holding tank 101. The B-side may be all polyol, or polyol with chain extenders, cross-linkers, catalysts, and other additives and auxiliaries known to the field of polyurethanes. The polyol is pumped from holding tank 101 through optional in-line blender 103 by suitable means, for example variable speed metering pump 105. High pressure pump 107 injects the B-side into high pressure mix head 109, which advantageously may be of the impingement mixing type.

At 111 is the A-side isocyanate tank, from which isocaynate is directed to the high pressure mix head 109 by high pressure pump 113. Compressed air is directed to the high pressure mix head through line 115, the amount of air determined by the air flow meter 117, and the volume controlled by valve 119 or by adjusting the pressure of supply air. From the high pressure mix head 109, the reactive mixture flows to froth foam mixing head 121 which may also include an inlet 122 for additional frothing gas, from which it is dispersed onto a conveyor or through a hose to the point of application.

The optional blender 103 consists of a standard liquid/solid blender having a supply hopper 123 containing filler, which is metered into the blender by means of auger 125. Standard techniques are used to measure and adjust filler weight added to the polyol.

Also shown in FIG. 1, entering high pressure mix head 109 are inlets 127 and 129 which may be used to supply additional streams of polyurethane ingredients such as catalyst solutions, cross-linkers, surfactants, colorants, additional isocyanate or polyol, auxiliary blowing agents, e.g. water, low boiling hydrocarbons, CFC-22, and the like. Preferably, the process is performed without auxiliary blowing agents. Additional inlets to the mix head may be provided as well, the various inlets providing for maximum flexibility in polyurethane stoichiometry.

The various components are standard components and readily available. Variable speed low and high pressure pumps are standard, off-the-shelf items available from numerous suppliers. A suitable filler/polyol blending unit is a Turburlizer I filler blender, available from Darwin Enterprises, Inc., Dalton, Ga. Other blenders are suitable as well. Likewise, high pressure mix heads are available from sources such as Cincinnati Milicron, Elastogran GmbH, Hennecke, and other suppliers. A suitable high pressure mix head is a carpet backing foam machine head available from Hennecke Equipment Co., Pittsburgh, Pa. Suitable froth foam heads include those available from Hobart, Oakes, and Lessco. A preferred froth, foam head is a "Firestone" type head designated Lessco System Superfoam Blender available from Lessco Corp., Dalton, Ga.

Suitable formulations for preparing froth foam are disclosed in the numerous references cited earlier, and are well known to those skilled in the art. A preferred froth foam formulation is ARCOL® froth foam mix available from ARCO Chemical Co., Newtown Square, Pa., which employs, in addition to polyol, silicone surfactant L5614 and urethane-promoting catalyst LC-5615, both available from OSi, Inc., and isocyanate E-448 available from Bayer, Pittsburgh, Pa.

The polyurethane froth foam formulation itself forms no part of the present invention, and many formulations are suitable. The filler may be any filler generally used, e.g. calcium carbonate, alumina trihydrate, talc, various clay minerals, e.g. bentonite, or mixtures of these.

Figure 2:
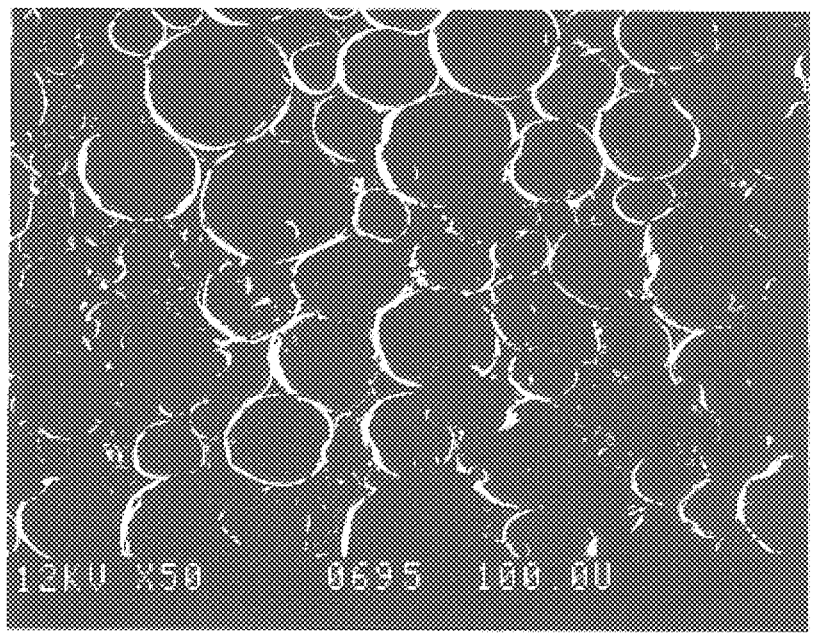
FIG. 2 is a scanning electron photomicrograph of a froth foam of the subject invention.
Figure 3:
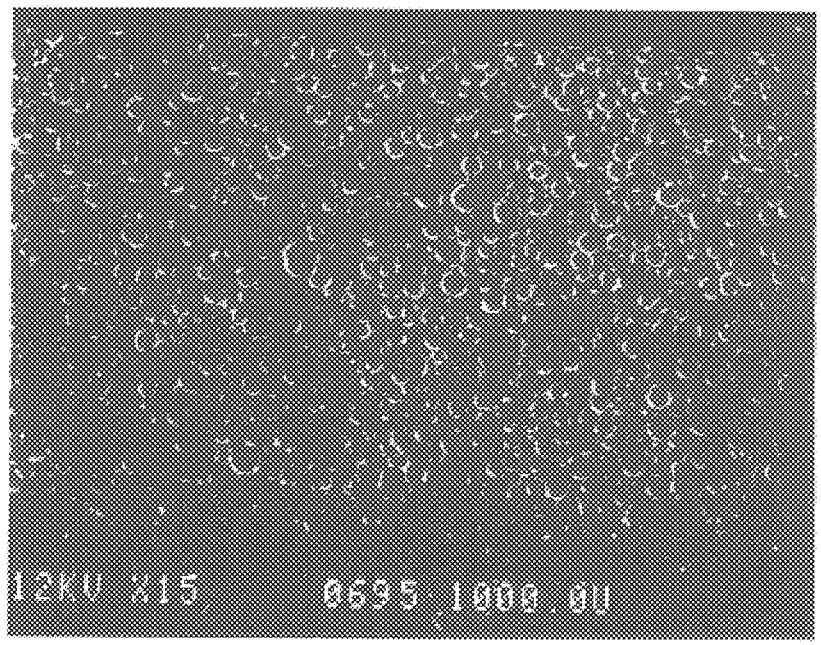
FIG. 3 is a scanning electron photomicrograph of a two layered froth foam of the subject invention.

FIG. 2 is a scanning electron photomicrograph of a section taken through a foam of the present invention. Noteworthy is the uniformity of the cell structure and the presence of large numbers of complete cells despite the shear required to provide an edge suitable for examination. FIG. 3 is a similar photomicrograph of a two layer froth foam product. Noteworthy is the fine and uniform interface between the two layers, the first layer showing virtually no coalescence. The two layer foam was produced by curing the first layer prior to application of the second layer (wet on dry).

The advantages of the subject process are numerous. In addition to providing a high quality product, even in the lower density ranges, two layer or multiple layer quality foams may be produced. Moreover, the stoichiometry of the product may be readily adjusted, either manually or under computer control, by adjusting the volume of the various feed streams to the high pressure mix head. The process is particularly flexible when rather than merely A- and B-side streams, individual components are supplied to the mix head.

Of particular note, however, is the uniformity produced in filled froth foams when filler is added to polyol in the in-line blender. Since the filler/polyol blend is injected into the high pressure mix head after only a short time, the viscosity of the blend remains low and exhibits little or no variation in viscosity. Moreover, due to the absence of increased viscosity over time, larger amounts of filler can be used, which otherwise, in a conventional process, would render the B-side too viscous or even gelled or thixotropic. Suitable amounts of filler range up to 450 parts per 100 parts by weight polyol, preferably 50 parts to 450 parts filler per 100 parts polyol.

Most especially advantageous in filled foams is the lack of density variation of the B-side/filler blend seen when conventional holding tanks are used. The stoichiometry and density both remain essentially constant over extended periods of time, and the process can be conducted without the complication and added expense of mass flow meters and associated equipment.

Having now fully described the invention, it will be apparent to one of ordinary skill in the art that many changes and modifications can be made thereto without departing from the spirit or scope of the invention as set forth herein.

What is claimed is:

1. A multilayer froth foam product comprising two or more individual layers of flexible polyurethane froth foam, wherein an interface between at least two of said two or more individual layers of polyurethane froth foam is substantially free of coalescence.

2. The multilayer froth foam product of claim 1 wherein at least one layer of said two or more individual layers of polyurethane froth foam contains a filler in an amount of from 50 parts to 450 parts filler per 100 parts polyol in a polyol component used to prepare said at least one layer.

3. The multilayer froth foam of claim 1 wherein said individual polyurethane foam layers are each individually prepared by the process of delivering polyurethane reactive components comprising an isocyanate component and a polyol component to a high pressure mix head; delivering compressed gas said high pressure mix head to form a frothable polyurethane reactive mixture; frothing said frothable polyurethane reactive mixture to form a curable polyurethane froth foam; forming a curable polyurethane froth foam layer from said curable polyurethane froth foam; and curing said curable polyurethane froth foam.

4. The multilayer froth foam of claim 3 wherein said polyol component contains a filler in the amount of from about 50 parts to 450 parts by weight filler per 100 parts polyol.

5. A multi-layer froth foam product comprising two or more individual layers of polyurethane froth foam, wherein an interface between at least two of said two or more individual layers of polyurethane froth foam is substantially free of coalescence, second and subsequent layers of said two or more layers of polyurethane foams having been prepared by contacting a reactive polyurethane froth directly with a prepared foam layer such that the two layers are in immediate contiguous contact.

* * * * *